United States Patent [19]

Uchiyama et al.

[11] 4,104,658
[45] Aug. 1, 1978

[54] DATA PRINTING DEVICE FOR CAMERA

[75] Inventors: Takashi Uchiyama; Noriaki Sanada, both of Yokohama; Teruo Otaka, Kawasaki; Yoshio Komiya, Tokyo; Youichi Okuno, Yokohama; Hideo Yokota, Tokyo, all of Japan

[73] Assignee: Canon Kabushiki Kaisha, Tokyo, Japan

[21] Appl. No.: 744,462

[22] Filed: Nov. 24, 1976

[30] Foreign Application Priority Data

Nov. 25, 1975 [JP] Japan .............................. 50-140880
Dec. 8, 1975 [JP] Japan .............................. 50-146155
Dec. 17, 1975 [JP] Japan .............................. 50-151143
Jan. 14, 1976 [JP] Japan .................................. 51-3591

[51] Int. Cl.² ......................................... G03B 17/24
[52] U.S. Cl. .................................... 354/106; 354/109
[58] Field of Search .................... 354/105, 106, 109; 355/40; 250/476

[56] References Cited

U.S. PATENT DOCUMENTS

| | | | |
|---|---|---|---|
| 3,029,717 | 4/1962 | Hildebrandt | 354/106 |
| 3,812,508 | 5/1974 | Matsuda et al. | 354/106 |
| 3,995,289 | 11/1976 | Shono | 354/105 X |

Primary Examiner—L. T. Hix
Assistant Examiner—M. L. Gellner
Attorney, Agent, or Firm—Toren, McGeady and Stanger

[57] ABSTRACT

The present invention relates to a data printing device suited to be built in a compact camera, the device is designed so that optical fibers are provided between the data carrier comprising data figures and the photosensitive film in such a manner that the data light is transmitted through the optical fibers so as to form an image of the data figures on the film plane by means of the image forming lens.

4 Claims, 27 Drawing Figures

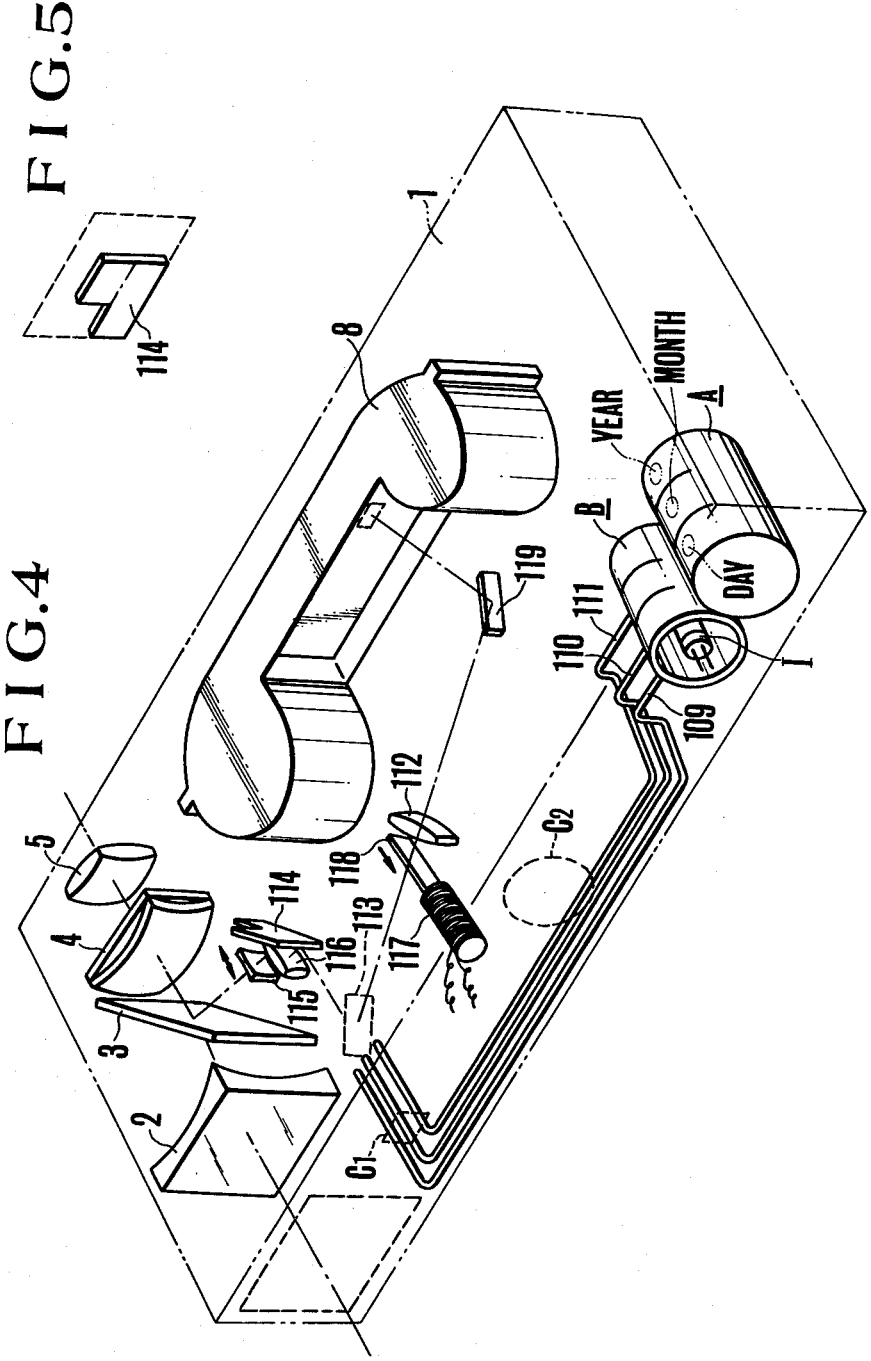

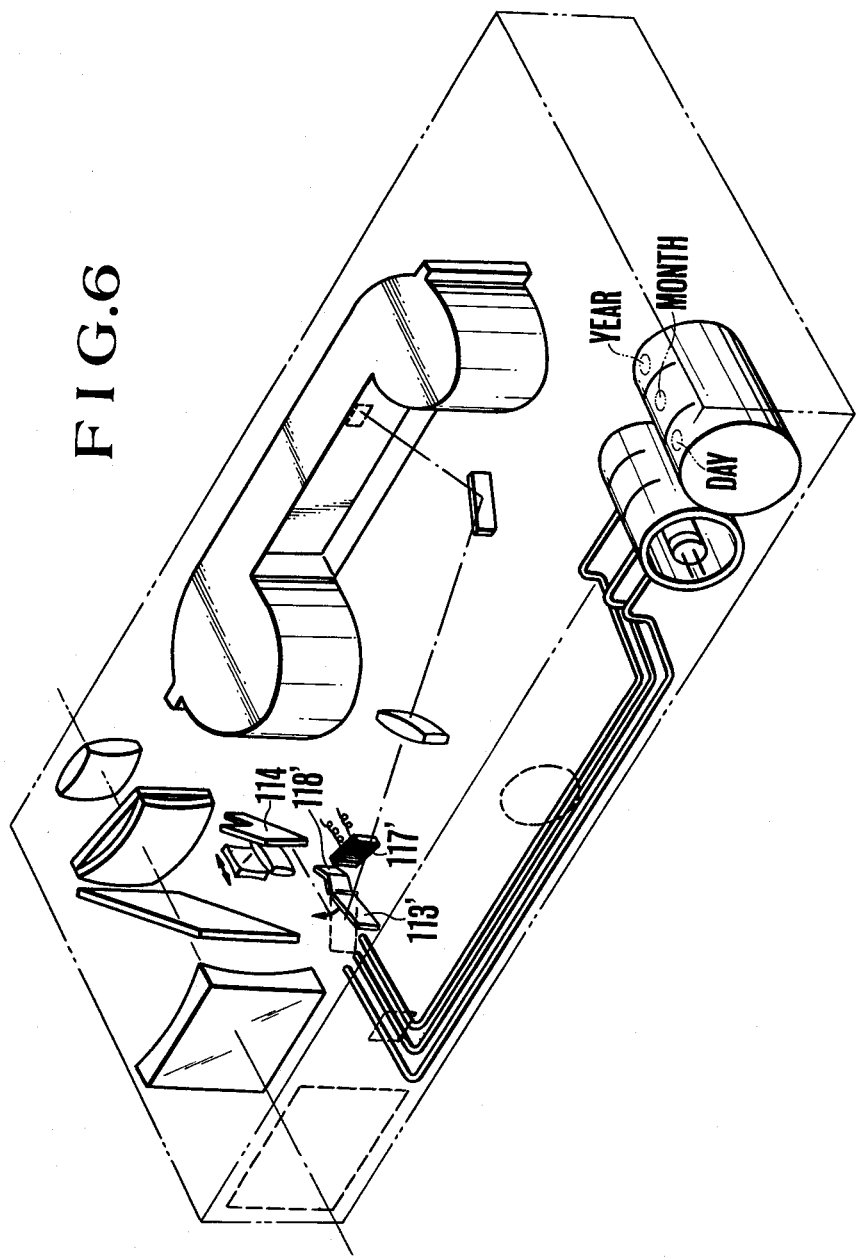

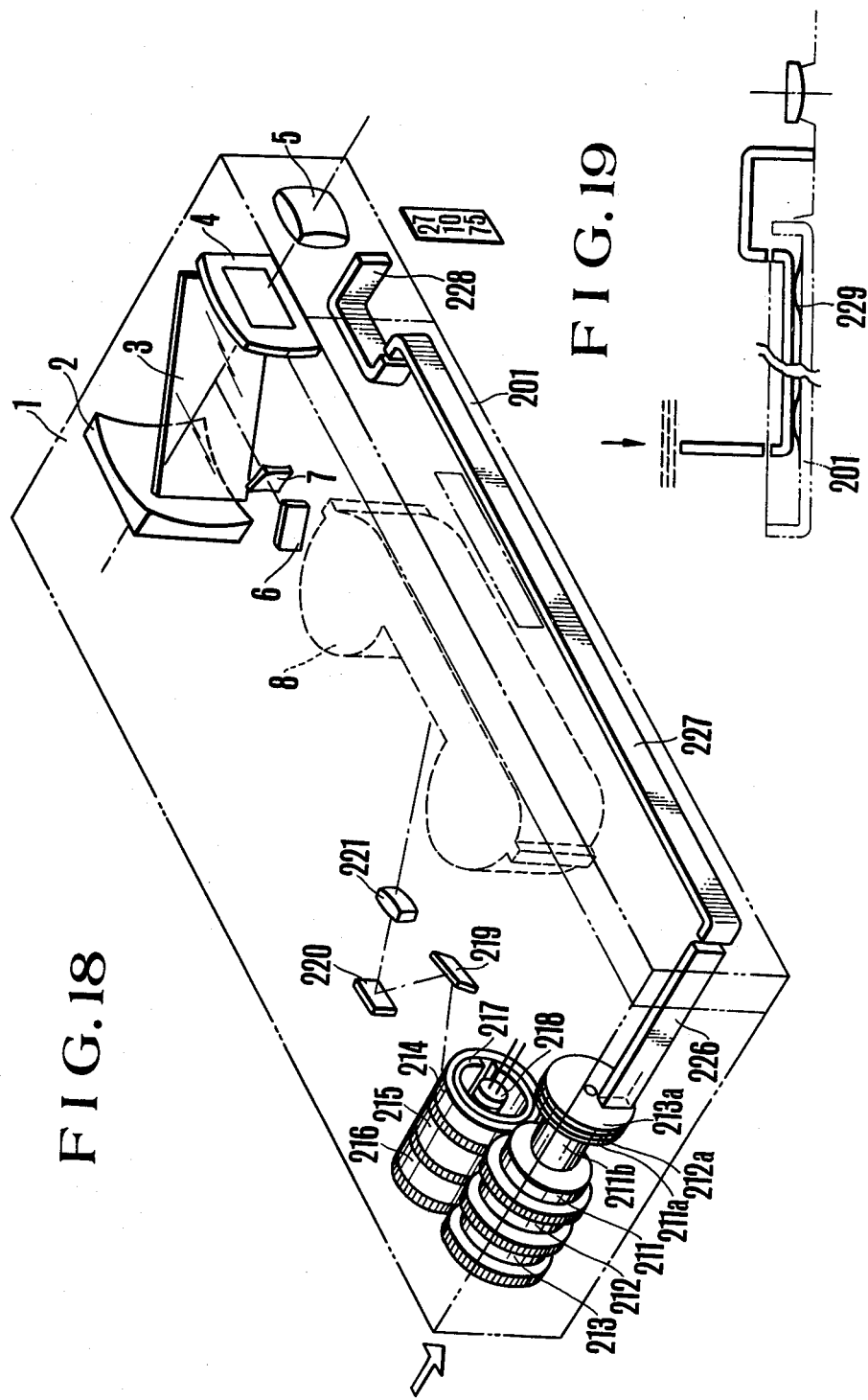

FIG.23
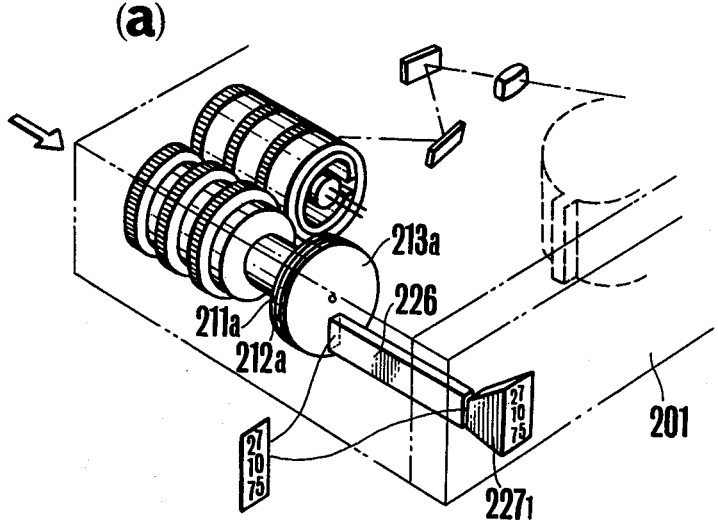
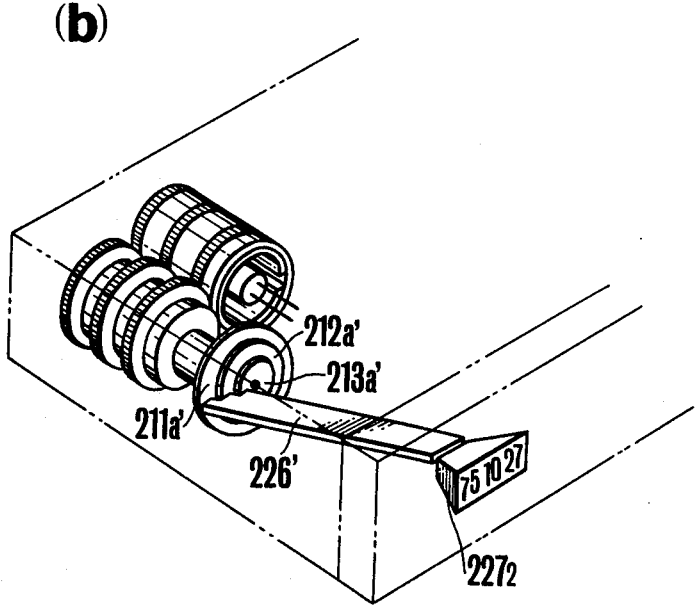

DATA PRINTING DEVICE FOR CAMERA

The present invention relates to a data printing device, and more particularly, a data printing device suited for a compact camera.

Until now, several data printing devices for printing the data on the photosensitive film plane beside the image of the object have been proposed. In such conventional data printing devices, the space in the camera is so small that various problems are encountered in incorporating the device in the camera. One such problem is that the camera includes only the smallest necessary space maintain compactness, such as is available for the film loading chamber, the winding up chamber, the film dark chamber, the view finder optical system and so on, so that any other additional device makes the camera body larger. This is especially so with regard to the data printing device wherein it is essential to transmit the data image to the film plane. This results in restrictions in the position as well as the composition of the printing device and only a special construction can be adopted. Further, in the case of the data printing, image light is led into the film dark chamber for which the light tightness is absolutely essential. Accordingly there is a danger that the image light might influence the film plane, which is very inconvenient. Further, in order to realize the data display outside of the camera or in the view finder visual field for confirming the data to be printed, the display optical means should be prepared apart from the data printing optical system so that it is inevitable that the composition as well as the assembling will become complicated.

Especially when a data printing device is built in such a compact camera which uses the film in the so called 110 type cartridge, it is necessary to provide the data printing optical system close to the film and further, in order to eliminate the parallax of the view finder, it is necessary to provide the optical system close to the photographic optical axis. Consequently, in order to make the camera compact, the view finder V and the data printing device D are provided on both sides of the photographic lens L provided in front of the cartridge, namely diametrically with reference to the photographic lens as is shown in FIG. 1.

In the case of such a disposition, it has been necessary to provide a complicated optical system or a complication motion mechanism in order to display the set data in the view finder by means of the data printing device because the data mechanism and the view finder are distant from each other.

A purpose of the present invention is to offer provide a data printing device capable of printing the data on the film beside the object image having a simplified construction by making use of optical fibers.

Another purpose of the present invention is to provide a data display device capable of transmitting the image of the data figures into the finder optical path having a simplified construction by making use of the optical fibers.

The present invention will be explained below in detail in accordance with the accompanying drawings of the embodiments of the present invention.

FIG. 4 shows a partial variation of the embodiment shown in FIG. 2.

FIG. 5 shows the mirror in FIG. 4 in enlargement.

FIG. 6 shows further other another embodiment shown in FIG. 2.

FIG. 18 shows the fifth embodiment in perspective view.

FIG. 19 shows the partial section.

FIG. 20(a) and (b) respectively show a partial section of the data carrier.

Figure 21:
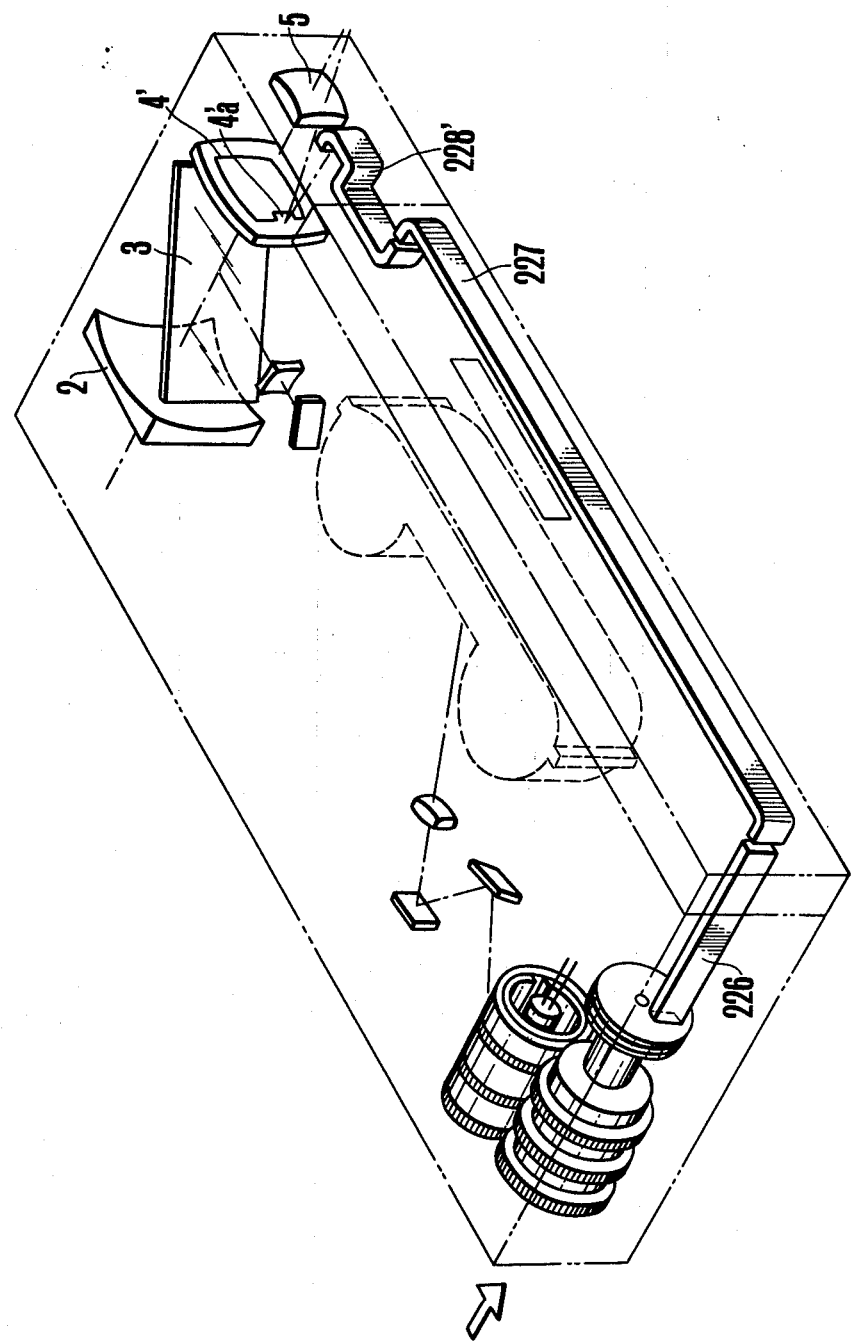

FIG. 21 shows a variation of the fifth embodiment.

Figure 22:
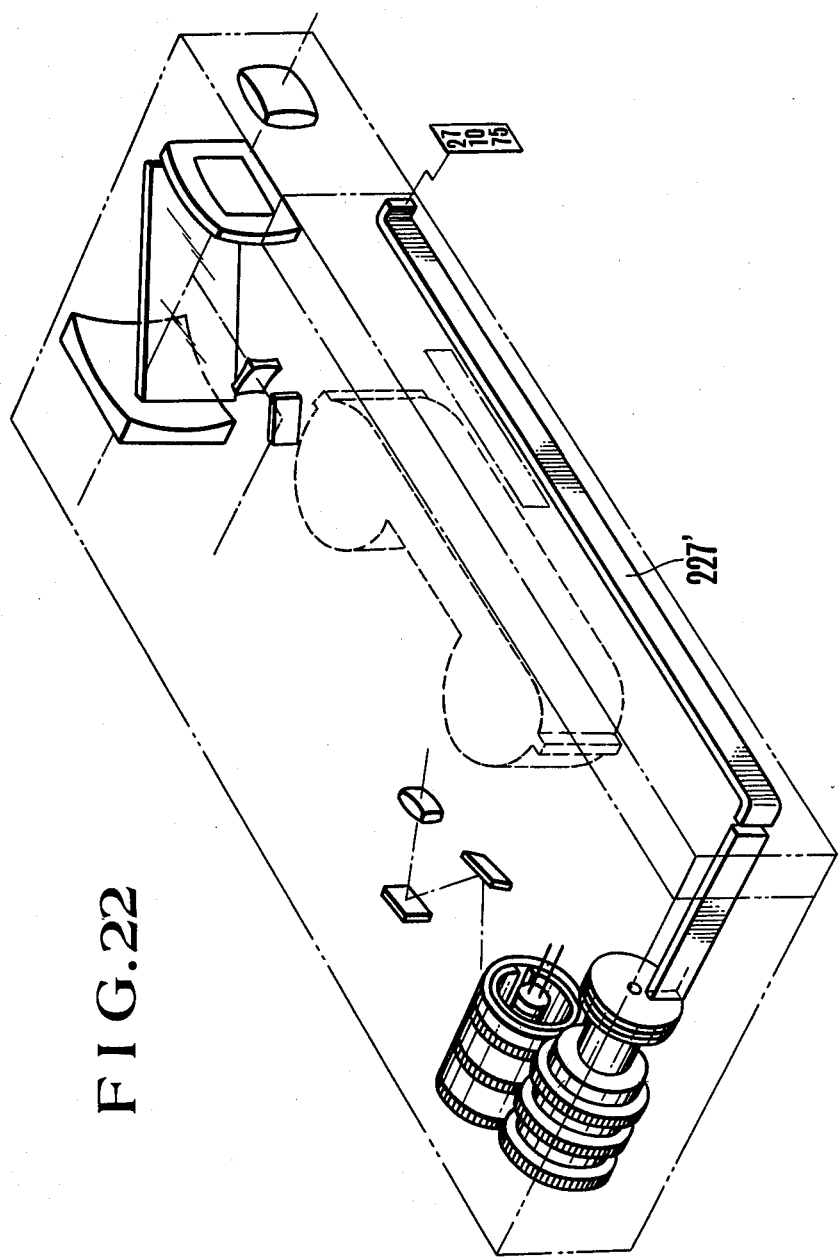

FIG. 22 shows yet another variation.

Figure 24:
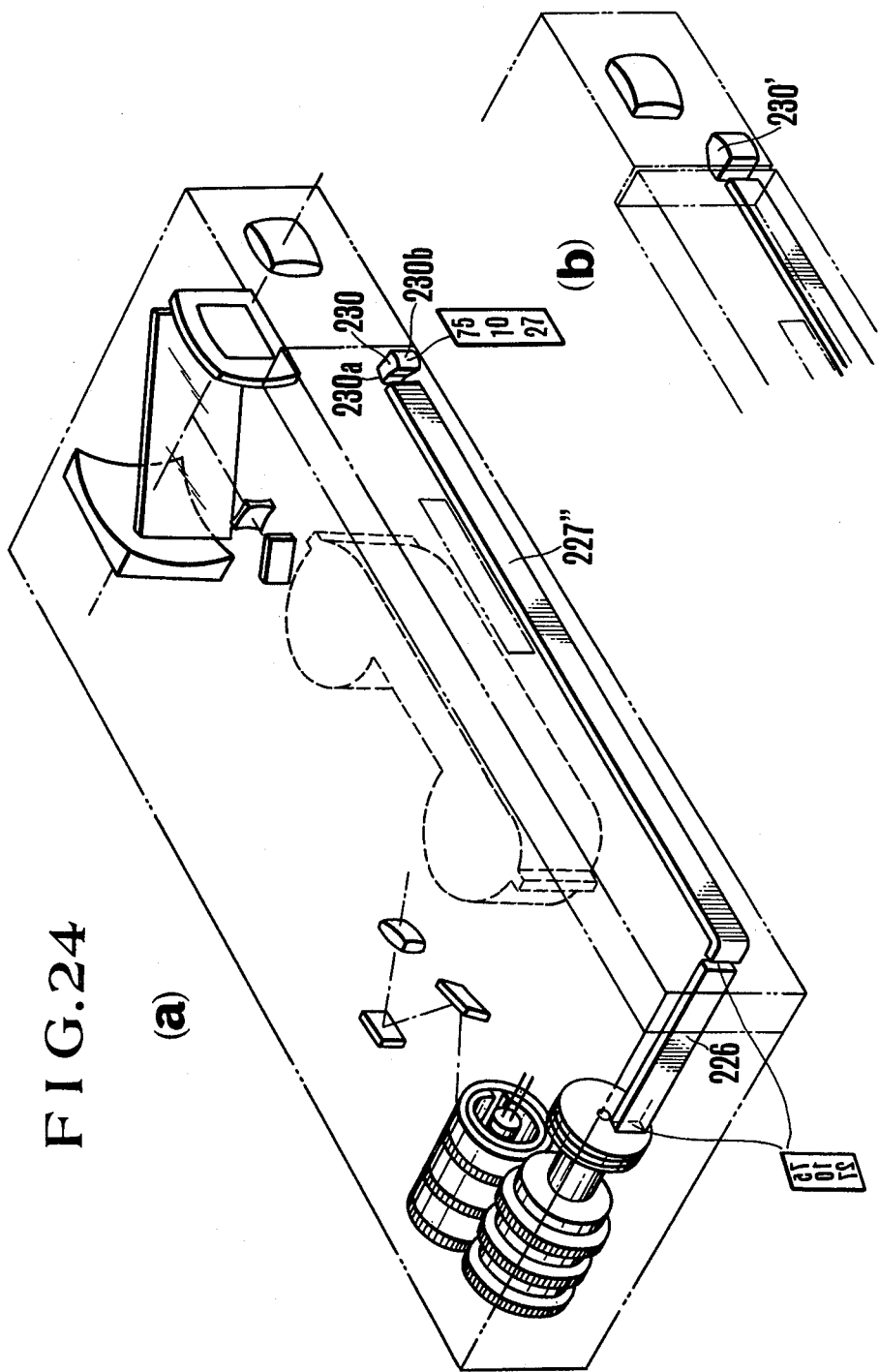

FIG. 23 (a) and (b) and FIG. 24 (a) and (b) respectively show variations of the data display part.

Figure 25:
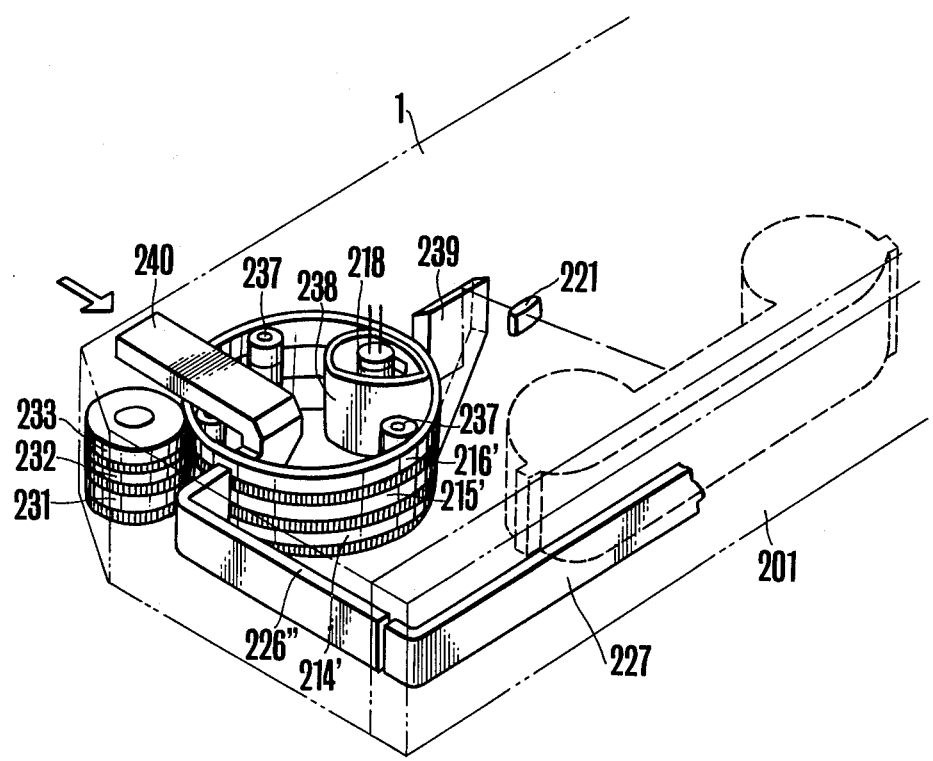

FIG. 25 shows a variation of the data carrier.

Figure 26:
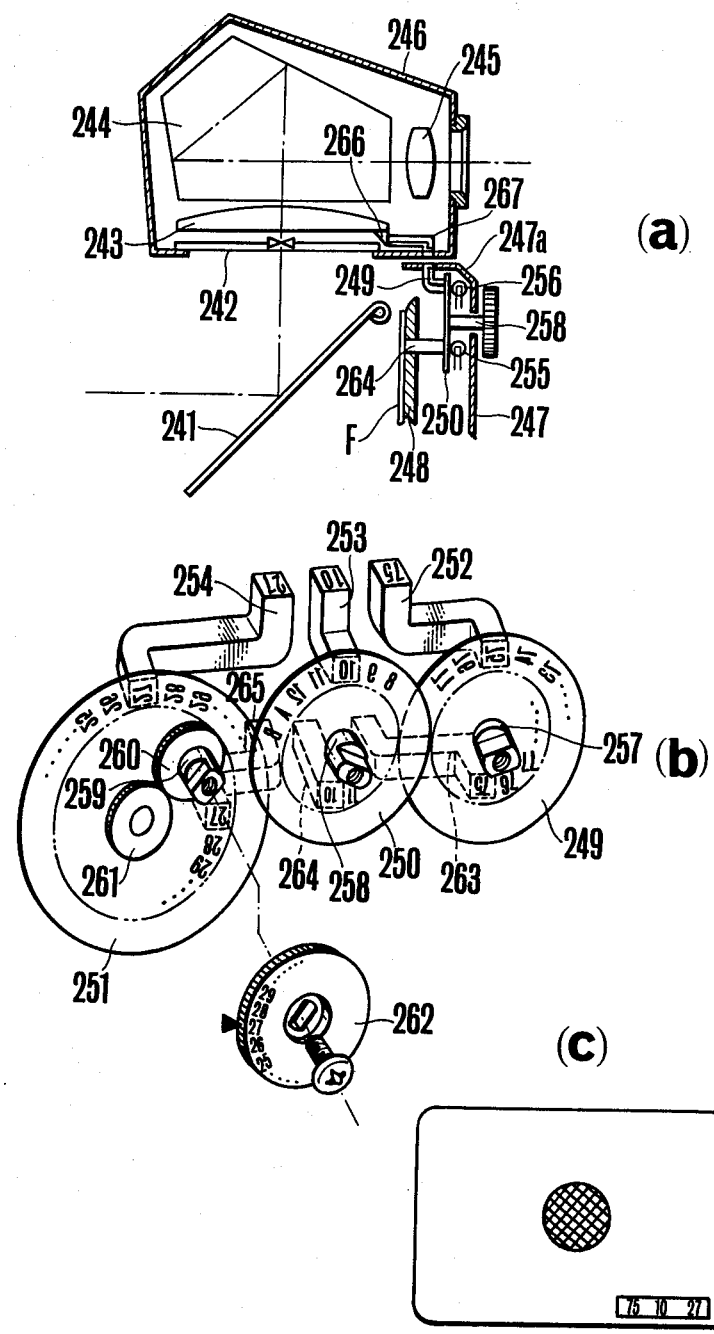

FIG. 26 shows the sixth embodiment, whereby (a) shows the section, (b) the perspective view and (c) the display state in the view finder.

Figure 2:
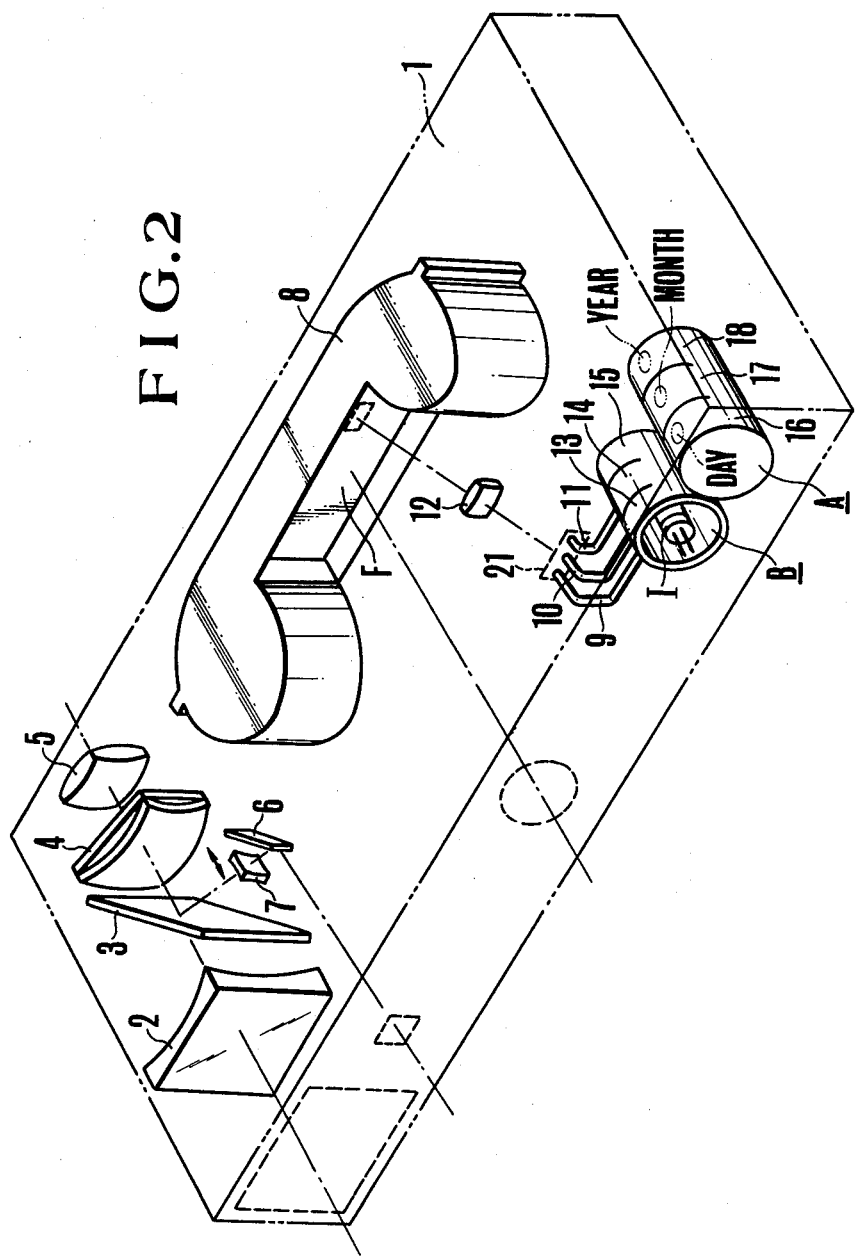
FIG. 2 shows the first embodiment of the present invention in perspective view.

In FIG. 2, 1 is the camera body while 2 – 5 are the view finder optical system including the objective lens 2, the half-permeable mirror 3, the intermediary lens 4 and the eye piece lens 5. 6 and 7 are the optical system constituting a range finder having a double image coincidence system, whereby 6 is the mirror while 7 is the lens to be displaced along the direction of the arrow in functional engagement with the photographic lens focusing mechanism. The view finder optical system as mentioned above is already known so that its detailed explanation is omitted here. 8 is the conventional film cartridge loaded in the camera, wherein the film supply chamber and the film winding up constitute one body chamber. 9 – 11 are the optical fiber bundle, whose one end face is supported on the surface of the ring B holding various marks and whose other end face projects into the film dark chamber, while 12 is the image forming lens projecting the data image formed on the other end face of the fiber bundle on the film plane.

Figure 1:
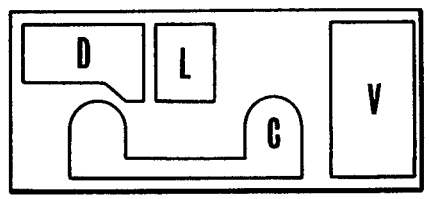
FIG. 1 shows the disposition of the components in the camera in plane view.
Figure 3:
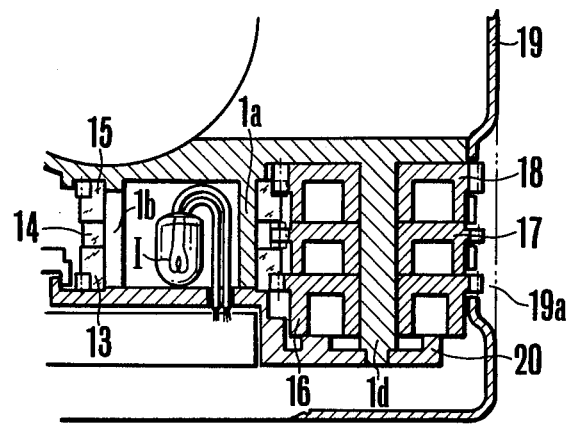
FIG. 3 shows a data carrier in section.

The data holding ring B consists of the rings 13, 14 and 15 of the transparent material, being rotatably adapted around the cylinder shaft 1a provided on the camera body as is shown in detail in FIG. 3, whereby the rings respectively bear on their circumference the film on which respectively the year, the month and the date are printed. 16, 17 and 18 are the data setting ring rotatably provided around the shaft 1d, whereby gear provided on its circumference engages with the gear provided on the circumference of the aforementioned mark holding ring in such a manner that the one part is exposed in the notch 19a provided on the external cover of the camera so that the data to be printed can be set from outside. The respective circumferences of the rings 16, 17 and 18 of the setting ring A are provided with the data figures corresponding to those on the figure holding rings 13, 14 and 15 so as to be observed through the window provided on the upper surfaces of the external cover 19 of the camera. When the data is to be set, the setting ring is operated while the figure observed through the observation window until the desired figures appears in the window, whereby the setting ring is retained at the position by means of the click stop in such a manner that the figure corresponding to the above figure comes to the position facing to the slit 1b provided on the cylinder shaft.

I is the illumination lamp provided in the internal space in the afore mentioned cylinder shaft 1a, while 20 is a cover for the setting ring A, the figure holding ring B and the lamp.

The optical fiber bundles 9 – 11 consists of gathered filaments, whereby the ends of the bundles respectively have an area sufficient enough to cover three kinds of data, namely the year, the month and the data printed on the figure holding ring B. When the year, the month and the date are selected by means of the setting ring 16 – 18, the respective data of the year, the month and the date are transmitted from the one end of the respective fiber bundles to the other end 21, so as to form the image of the respective data at the end 21. Thus, the image forming lens 12 is provided in the photographic optical path formed by the photographic lens so that the image of the lens 12 is never formed on the film plane.

The length as well as the shape of a fiber bundle can optionally selected so that the drums A and B can be disposed in any spaces in the camera.

When the shutter is released after the photographic preparation by means of the conventional means in the above mentioned composition, the illumination lamp I lights up in functional engagement with the opening operation of the shutter so as to illuminate a line of data figures facing to the slit 1b. This is done in such a manner that the light having passed the slit 1b is transmitted through the fibers so as to form the image of the data at the end face 21, whereby the image of the data figures is formed on one part of the film plane F by means of the image forming lens 12. The lamp I is controlled so as to light up during a certain determined necessary time and then to be put out independently of the closing operation of the shutter.

FIG. 4 shows another embodiment of the compact camera in which the data printing device in accordance with the present invention is built, whereby the same components have the same figures.

Figure 8:
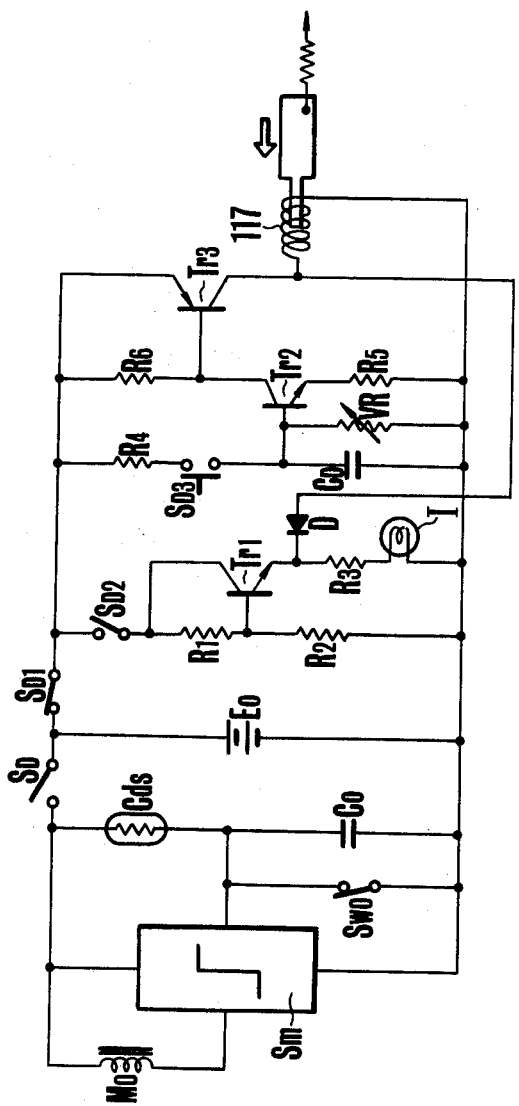
FIG. 8 shows the electrical circuit of the embodiment shown in FIG. 1.

The fibers 109, 110 and 111 are extended along the arranging direction of the view finder optical system provided to the left of the camera body along the fixed frame on the front and lower part of the camera body 1, whereby, at the end of the fibers, a half-permeable mirror 113 (shown in dotted lines in the drawing) is fixed slantedly to the optical axis. 114 is the totally reflecting mirror, assuming such a reversed L-shaped form as is shown in the full line against the total visual field shown in the dotted line. The mirror part above the dotted line of the totally reflecting mirror 114 is the part having an area for receiving a part of the object image coming through the opening C1 provided in the camera casing for receiving the viewfinder double image light beam. The part below the dotted line is the one for reflecting the data image formed at the end of the fibers toward the view finder optical path through the half-permeable mirror. 115 and 116 are respectively the lenses provided facing to the mirror 114, whereby the lens 115 constitutes the range finder with the double image coincidence system, being displaced along the direction of the arrow in functional engagement with the photographic lens focusing mechanism (corresponding to the lens 7 in FIG. 2). The other lens 116 is the visibility adjusting convex lens for projecting the data image formed at the end of the fibers 109 – 111 in the view finder visual field as sharply as the object image for the double image coincidence. 117 and 118 constitute an electromagnetic shutter which normally cuts off the light reflected by means of the half-permeable mirror 113 but is withdrawn from the light shading position shown in the drawing during a certain determined time by means of an electrical circuit so as to permit the data image at the end of the fibers on the photosensitive film plane through the reflecting mirror 117 is an electro-magnetic solenoid while 118 is a shutter bladed shaped plunger which normally assumes the light shading position shown in the drawing by means of the strength of a spring not shown in the drawing but is attracted against the strength of the spring by means of the current supply to the solenoid so as to assume the opened state of shutter. Hereby the image forming lens 112 and the reflecting mirror 119 are provided in the film dark chamber outside of the photographic optical path so that no shadows of them are printed at the time of taking a photograph. FIG. 8 shows the control circuit of the afore mentioned electromagnetic shutter and the light source together with the exposure control electric shutter circuit. In the drawing, CdS is the photoconductive element arranged in the camera responsive the light from the object, Co the time constant condenser, Swo is the normally-opened short circuit switch to be opened in functional engagement with the opening operation of the shutter, Sm the schmitt-circuit and Mo the shutter closing control magnet, whereby the constitute a conventional electronic shutter circuit. Eo is the battery and So the power source switch to be closed in functional engagement with the shutter release lever. SD1 is the change over switch to be closed in functional engagement with the change over lever for data printing provided on the outer surface of the camera when the data is desired to be printed, SD2 the confirming switch to be closed when the data is to be confirmed, R1, R2, R3, R4, R5 and R6 the fixed resistances. Tr1, Tr2 and Tr3 the transistors, D the diode, CD the time constant condenser and SD3 the switch to be closed for an instant in functional engagement with the return motion of the shutter release lever.

In order to print the data in the above mentioned composition, the switches SD1 and SD2 are closed, when the transistor Tr1 is closed and the light source I lights up so that the set data is made to appear in the view finder visual field by means of the fibers 109 – 111. Thus, it is confirmed whether the desired data is correctly set. At this time, any misoperation of the electromagnetic solenoid is impossible due to the non-return diode D. When then the shutter release lever is operated, So is closed in such a manner that the electric shutter circuit is actuated in functional engagement with the opening operation of the shutter. After lapse of a time corresponding to the object brightness, the closing operation of the shutter is actuated by means of the magnet Mo, whereby as soon as the release lever assumes the initial position, the switch SD3 is closed so that the condenser CD is quickly charged. By means of setting the resistance R4, the release lever assumes the initial position again so as to open the switch SD3, when the condenser CD has been charged. By means of the charge of the condenser CD, the transistors Tr2 and Tr3 are brought into the conductive state, so as to excite the solenoid 117 so that the plunger 118 is retired into the shown position in such a manner that the data light is projected on the film. The charge in the condenser CD is discharged through the variable resistance VR and the transistors Tr2 and Tr3 are brought into the non-conductive state after a certain predetermined time, when the solenoid 117 is no more excited and the plunger is moved into the light shading position. As the result, the data is always printed in the determined time.

Because the circuit for the light source I is formed through the diode D in parallel to the excitation current circuit for the solenoid 117, even if the confirming switch SD2 is opened, the light source I lights up at the same time with the excitation of the solenoid 117 so as to produce a data printing light beam. Hereby, when a value in accordance with the ASA sensitivity is set at the variable resistance VR in advance, the data printing time in accordance with the type of the film is determined in such a manner that the printing with the same density is always possible.

Further the diameters and so on of the fibers 109 – 111 of the above mentioned embodiment are the same as those of the embodiment shown in FIG. 2.

Consequently, when the data is not printed in the above mentioned composition, the change over button is set in the non-operable state, whereby neither the light source I nor the solenoid 117 operates in such a manner that the data image does not appear in the view finder visual field at all while at the same time the data is not printed on the photosensitive film plane at all. When, on the other hand, it is desired to print the data, the change over button is changed over into the operable state so as to light up the light source I. The setting ring can be operated from outside of the camera body as is shown in FIG. 3, so as to select the desired data, namely the year, the month and the date at which the picture is taken. The data to be selected can be confirmed by observing the display data on the setting ring from outside of the camera casing or looking into the view finder. The object image for the double image coincidence and the data image projected at the ends of the fibers are superimposed, in the view finder by means of the mirror 114, with the object image by means of the half-permeable mirror 103 in the view finder optical system in such a manner that the image of the data, namely the year, the month and the date provided on the figure holding ring B appears at the lower part of the whole visual field corresponding to the position at which the data is printed on the film. Consequently, when the data is printed, the same image of the data as that to be printed can be observed in the view finder visual field in such a manner that the errorneous selection can be confirmed every time, if any, so as to prevent mistake in the photography. When then shutter is released, the film is exposed, while at the same time, in functional engagement with the operation of the shutter, the solenoid 117 is excited during a certain determined time by means of the circuit shown in FIG. 8, so as to attract the plunger in such a manner that the data image formed at the other ends of the fibers 109 – 111 is printed on the film plane by means of the half-permeable mirror 113, the image forming lens 112 and the reflecting mirror 119 with a certain determined density.

Further, it is also possible that, as is shown in FIG. 6, a whole mirror 113' is provided instead of the above mentioned half-permeable mirror 113 in such a manner that the mirror 113' is normally retired by means of the solenoid 117' so as to be kept at the position at which the printing light path is cut off and driven into the position in the dotted line when the data is printed, whereby the mirror 113' serves as the substitutes for the shutter 117 and 118. Further, the light source I and the solenoid 117 may be designed to be brought into the functional engagement with the release button so as to light up respectively at every operation of the release button so that the power economizing efficiency can be achieved.

Figure 7:
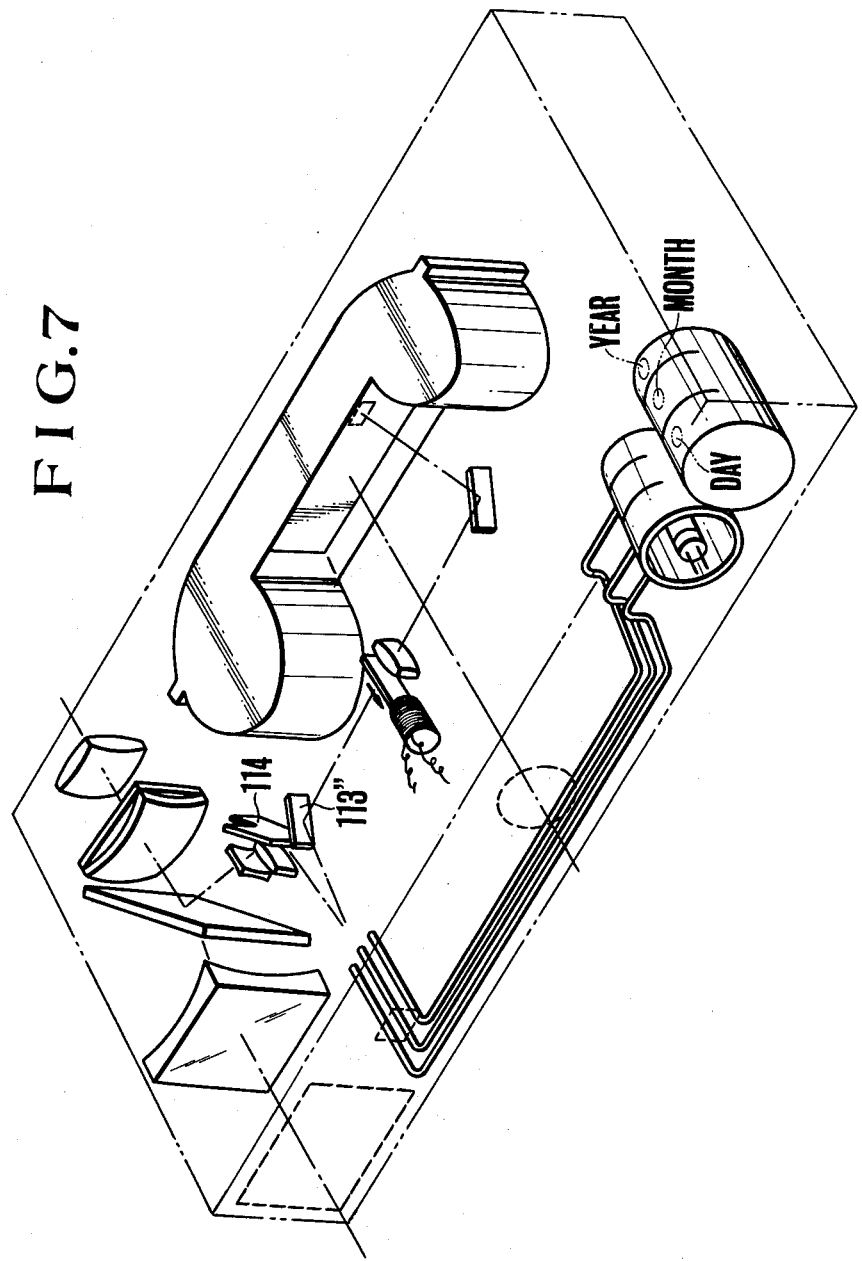
FIG. 7 shows further other still another embodiment shown in FIG. 2.

Further, it is also possible that, as is shown in FIG. 7, instead of the half-mirror 113 shown in FIG. 5, a whole mirror 113'' is provided in parallel to the reflecting mirror 114, so as to lead the data image formed at the ends of the fibers into the data image printing optical path. The light amount of the data image formed at the ends of the fibers is almost equal when observed from the mirrors 114 and 113'' when the angle between them is comparatively small so that, by making use of the half-permeable mirror, both the display in the view finder visual field and the printing are possible without any loss in the light amount.

Figure 9:
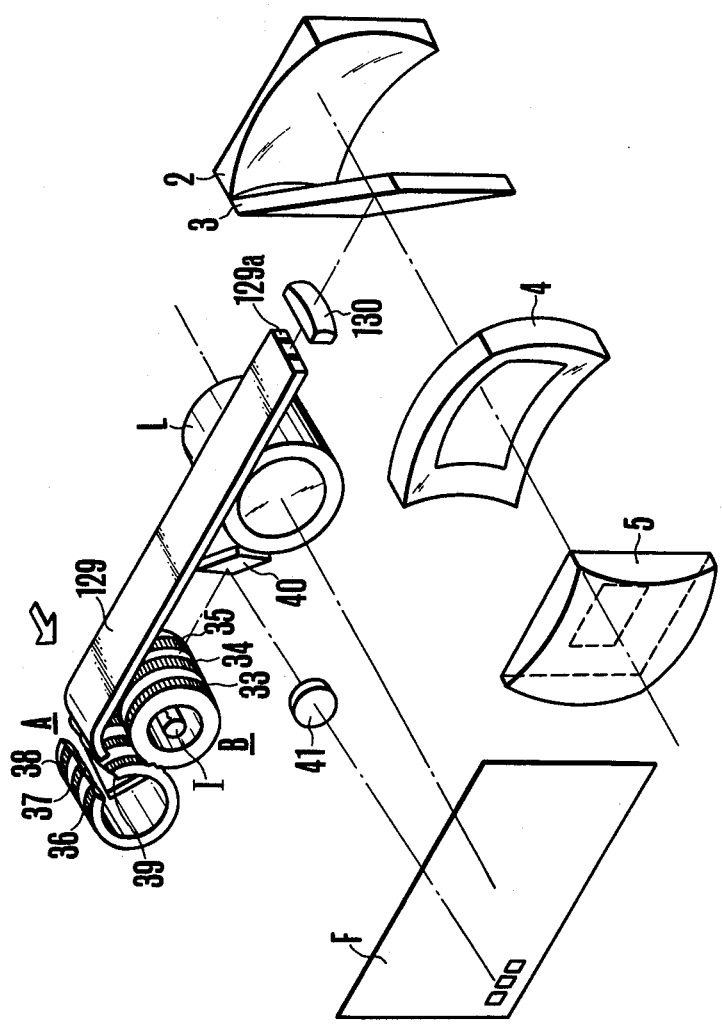
FIG. 9 shows the second embodiment in perspective view.

FIG. 9 shows an embodiment so designed that the image of the data figures set on the data setting ring is led into the view finder optical path through the optical fibers. In the drawing, 33, 34 and 35 are the three data rings for printing constituting the first unit B presenting around the circumference the display part on which the transparent figures representing the year, the month and the date are provided and the gear part and rotatably adapted around the cylinder shaft (not shown in the drawing) fixed on the camera body in the same way as in case of the first embodiment. In the above mentioned cylinder shaft, a lamp is provided so as to be in a position to illuminate the figures for the year, the month and the date through the slit provided on the cylinder wall and the rings 33, 34 and 35.

36, 37 and 38 are the data display rings constituting the second unit A presenting the display part and the gear part and adapted rotatably around the not shown cylinder shaft in the same way as in the case of the printing data holding ring B so as to engage with the ring B, whereby a part of the gear part projects through the side wall of the camera so as to be operated from outside.

In the internal space in the cylinder shaft a reflecting mirror 39 is provided slantedly in such a manner that the light coming in through the window on the front plane of the camera is reflected by the reflecting mirror 39, passes through the ring A via the slit provided on the cylinder shaft and illuminate a set of numerical figures, namely the year, the month and the date. At the position facing the above mentioned slit on the circumference of the ring A, the end of the optical fiber bundle 129 is arranged, whereby the optical fiber bundle is laid over the photographic lens barrel L to reach the neighborhood while the image of the data figures illuminate by the light from outside is transmitted to the end 129a through the fiber bundle 129, so as to be observed in the view finder through the concave lens 130, the half-permeable mirror 3 and the eye piece lens 5.

Because in the case of the above mentioned composition, the data figures are displayed in the view finder being normally illuminated by the light coming from outside, the photographer can set the desired data in the view finder by rotating the gear part of the ring A, while observing the figures displayed in the view finder. At this time, in functional engagement with the above, the ring B also rotates in such a manner that the same figures for the year, the month and the date as is displayed in the view finder come in front of the afore mentioned slit so as to be ready for the data printing.

When the shutter is released after the photographic preparation, in the same way as in the above mentioned case the lamp lights up in functional engagement with the shutter release so as to illuminate the numerical figures for the year, the month and the date set on the printing ring and print the image on the film through the mirror 40 and the image forming lens 41.

The time during which the lamp I lights up is adjusted in accordance with the film sensitivity.

Figure 10:
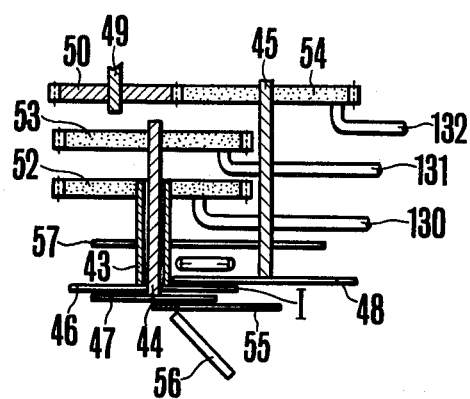
FIG. 10 shows a variation of the data carrier in section.
Figure 11:
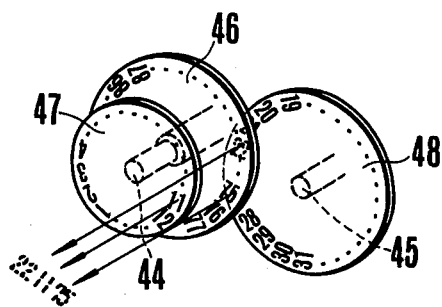
FIG. 11 shows the data carrier shown in FIG. 10 in perspective view.

FIGS. 10 and 11 show a variation, whereby the printing unit and the display unit are disc-shaped.

In FIG. 10, 46, 47 and 48 are transparent discs on whose circumferences the numerical figures for the year, the month and the date to be printed are respectively provided, whereby the numerical figures are not transparent.

52 is a transparent disc on which the non-transparent numerical figures to the year are arranged in circle, being connected to the afore mentioned disc for the numerical figures 46 by means of the cylinder shaft 43 and comprising the handling teeth on the circumference.

53 is a disc on which the numerical figures for the month are arranged in the same way, being connected to the afore mentioned disc 47 by means of the shaft 44 provided in the cylinder shaft 43 and comprising the handling teeth in the same way.

54 is a disc for the numerical figures for the date, being connected as one body with the afore mentioned disc 48 by means of the shaft 45, whereby the teeth provided on the circumference engage with the handling gear 50 comprising the shaft 49 in such a manner that a part of the gear 50 together with the teeth of the discs 53 and 52 projects outside of the camera so as to be manually operated.

The printing discs 46, 47 and 48 are laid one over the other as is shown in FIG. 11, and the figures on each disc are illuminated by the lamp I whereby one set of them is led through the mark 55 via the reflecting mirror 56 into the printing optical path.

FIG. 11 shows the arrangement of the printing discs, whereby the disc 46 and the disc 47 lie one over the other concentrically while the disc 48 lies excentrically crossing with the above both discs in such a manner that the figures for the date on the disc 48 are nearest the shaft 44, the figures for the month on the disc 47 are outside of the figures for the date while the figures for the year on the disc 46 whose diameter is larger than that of the disc 47 are further outside of the figures for the month in such a manner that at the right side of the shaft 44 the figures are arranged in sequence of the year, the month and the date.

In the neighborhood of the back side of the figure bearing parts of the discs 52, 53 and 54 the optical fiber bundles 130, 131 and 132 are respectively provided in such a manner that in the same way as in the afore mentioned case the data figures provided in the neighborhood of the view finder are displayed at the other ends of the fiber bundles in the view finder.

57 is the light shading plate for protecting the printing optical path from the light from outside.

The present embodiment is so designed that the first unit comprising the figures to be printed is illuminated during a certain determined time by means of the built-in light source so as to print the data while the second unit is normally illuminated by means of the light from outside so as to display the data figures in the view finder by making use of the optical fiber bundles so that a camera with a built-in data printing device can be obtained with simple construction, whereby the data setting and their confirmation at the time of taking a picture can be carried out with sureness.

Figure 12:
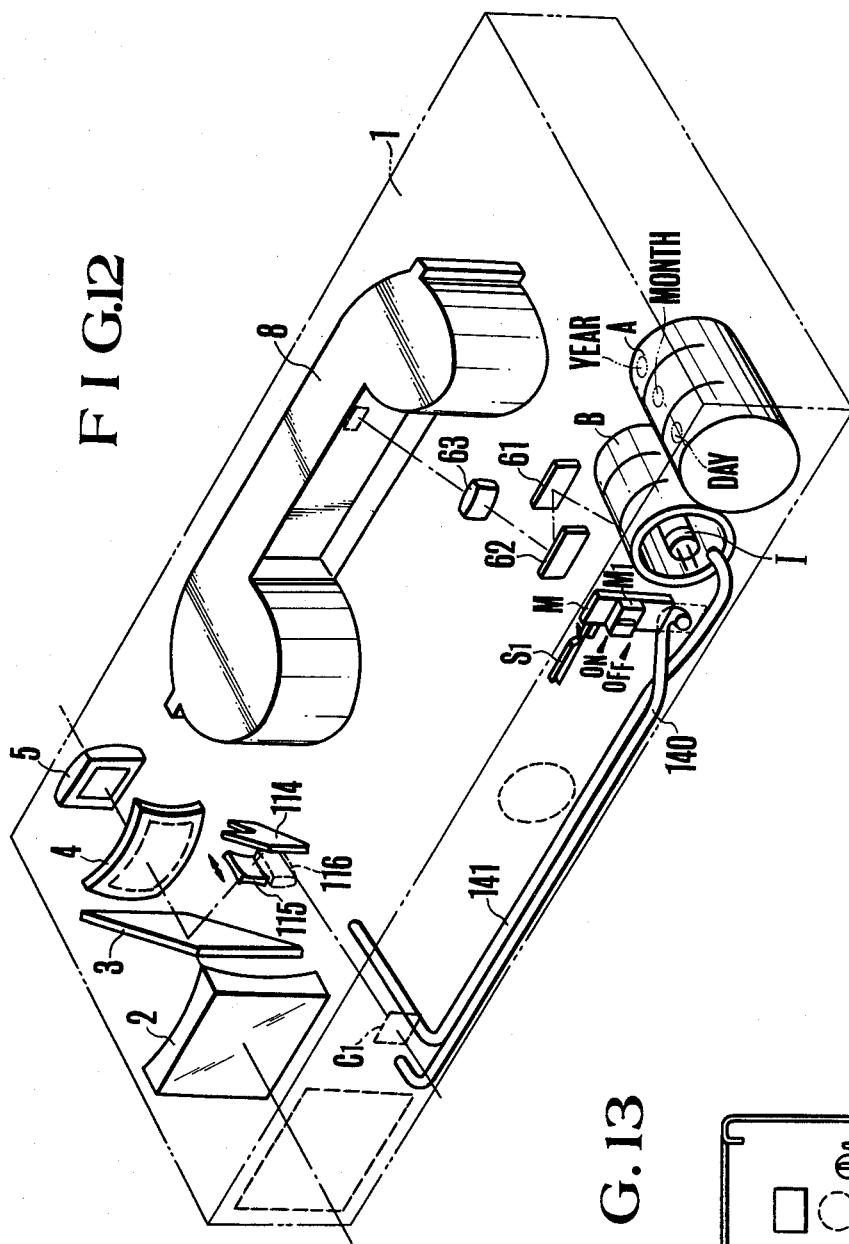
FIG. 12 shows the embodiment shown in FIG. 3 in perspective view.

FIG. 12 shows another embodiment which is provided with the change over means for changing the data printing mode into the data non-printing mode and vice versa, whereby the then mode is displayed in the view finder by making use of the optical fiber bundle.

In the drawings 2 - 5 are the view finder optical system as in FIG. 2 or 4, 114 the reflecting mirror for the range finder as in FIG. 5, 115 the movable lens for the range finder and 116 the convex lens provided below 115. The data setting ring A and the data figure holding ring B are composed in the same way as is shown in FIG. 3 in such a manner that the lamp I lights up the image of the light passing through the data figures on the ring B is formed on the film F by means of the mirrors 61 and 62 and the image forming lens 63. M is the mode change over board whose operation nob M1 projects outside of the camera to be moved sliding upwards and downwards so as to operate the switch S1 for closing or opening the circuit of the lamp I. 140 is the optical fiber bundles whose one end face to the window to be opened or closed by means of the lower end of the afore mentioned change over board on the front plate of the camera and whose other end is arranged beside the range finder window C1 so as to face to the afore mentioned reflecting mirror 114.

Figure 13:
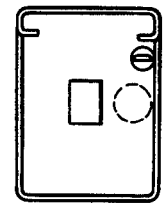
FIG. 13 shows the view finder visual field in the above embodiment.
Figure 14:
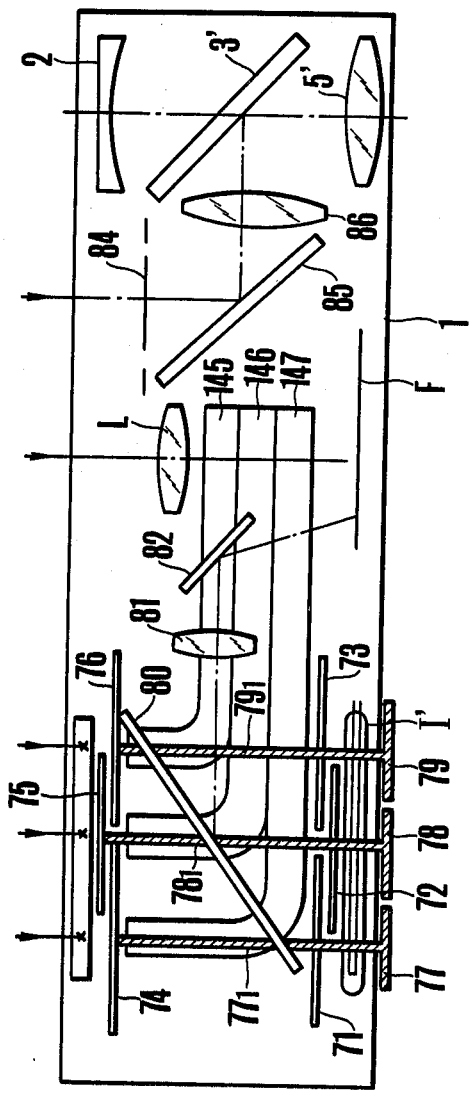
FIG. 14 shows the fourth embodiment in plane view.

141 is the optical fiber bundle whose one end faces to the light source I and whose other end faces to the lower wide side of the mirror 114. When the nob M1 is set in the switching on mode so as to change over the camera into the data printing mode in the above mentioned composition, the switch S1 is closed while at the same time the light shading at the one end of the optical fiber bundle 140 is removed so that the light comes into the fiber body 140 from outside of the camera. When for example a figure "D" is provided at the other end of the fiber body 140, the figure "D" shown in FIG. 13 can be observed brightly in the view finder, from which the photographer notices that the camera is set in the data printing mode.

Figure 17:
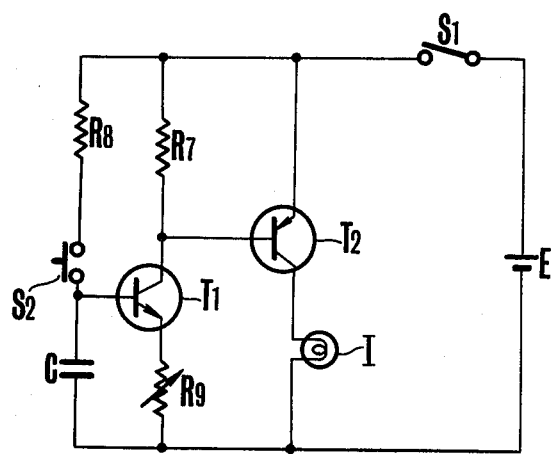
FIG. 17 shows the electrical circuit diagram.

FIG. 17 shows the control circuit of the light source I. The start switch S2 is short-circuited for a short time (for example 10 ms) for example in functional engagement with the shutter button in such a manner that the condenser C is charged with a short time constant of the time constant circuit R1.C.

When a data is to be printed on the film, at first the switch S1 is closed, whereby because the condenser C has not charged, the transistor T1 and therefor the transistor T2 is in the switched off state so that the light source I does not light up. Consequently the consumption of the power source can be kept considerably small even if it is forgotten to open the switch S1.

Then the start switch S2 is short-circuited for a very short time for example, in functional engagement with the shutter button while the switch S1 is kept in the closed state. The short-circuit time at this time is to be set sufficiently short in comparison with the time constant determined the resistance composed by the input impedance of the transistor T1, and the resistance R8 and the condencer C. The time constant of R.C is naturally supposed to have been chosen sufficiently short as compared with the short-circuit time of the start switch S2. In this way by short-circuiting the start switch S2 the condenser C is charged through the resistance R8 in such a manner that the transistors T1 and T2 are brought into the switched on state by means of the charge voltage in such a manner that the lamp I lights up.

The start switch is short-circuited for a short time and then opened, whereby the charge in the condenser starts to be discharged through the base and the emitter of the transistor T1 in accordance with the time constant determined by the resistance composed by the input impedance of the transistor T1 and the resistance R8 and the condenser C, during which time the transistors T1 and T2 are kept in the switched on state so as to light up the light source I for a certain determined time and then brought into the switched off state so as to wait for the next operation cycle.

In accordance with the present embodiment, when the time constant determined by the condenser C and the afore mentioned composed resistance is chosen sufficiently large as compared with the short-circuit time of the start switch S2 the lighting time of the lamp I can be kept nearly constant even if the influence due to the irregular manual operation is given to the start switch.

When further the resistance R9 is constructed variable so as to be adjusted in accordance with the film sensitivity, the lighting time of the light source for the automatic data printing can be automatically compensated in such a manner that the data can be always properly exposed to the film plane.

Hereby R7 is the output resistance of the transistor T1.

Further the contactless switch and so on can also be used in order to stabilize the operation of the start switch S2. When the light source I lights up so as to be prepared for the data printing the one end of the fiber bundle 141 is illuminated so that the transmitted light coming out of the other end forms the image of the former end of the fiber bundle 141 in the view finder bundle 141 as a bright spot one by means of the mirror 114, the lens 116 and the half-permeable mirror 3 so that it is possible for the photographer to confirm that the camera is in the data printing mode.

In consequence at the same time with the confirmation of the photographic view field and the focusing it is possible for the photographer to confirm whether the camera is set in the data printing mode together with the confirmation of the printing state.

Figure 15:
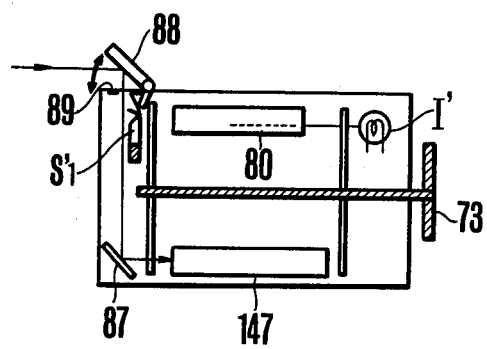
FIG. 15 shows the side section.
Figure 16:
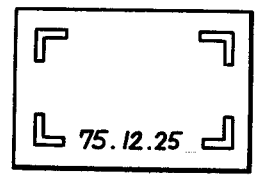
FIG. 16 shows the view finder visual field in the above embodiment.
Figure 20:
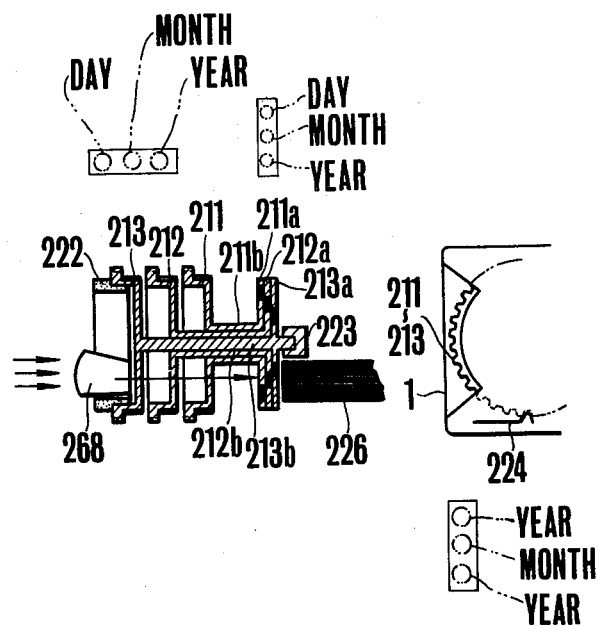
Figure 20:

FIG. 20 shows another embodiment of the camera including the data printing device in accordance with the present invention, so designed that the figures on the data display disc can also be displayed in the view finder by means of the fiber body. In the drawing, 1 is the camera body, 71, 72 and 73 the printing data discs and 74, 75 and 76 the data display discs whereby both kinds of the discs are combined rotatably as one body with each other respectively by means of the shafts 77, 78 and 79, whereby each disc is provided with the transparent figures such as numerical figures or character representing the year, the month and the date. The one end of each shaft projects outside of the camera, comprising the data setting dial 77, 78 and 79 so as to respectively set the numerical figure for the year, the month and the date to be printed by rotating the shaft. 80 is the reflecting mirror slantly provided behind the data discs 71 – 73, 81 the data image forming lens, 82 the reflecting mirror and I' the data illuminating lamp provided in front of the data discs, whereby when the lamp I' lights up for a certain determined time in functional engagement with the shutter release operation as is already known, the light passing through the data figures on the discs 71 – 73 forms the image of the data figures on the film F through the reflecting mirror 80, 82 and the image forming lens 81 in such a manner that the data figures are printed on the film F together with the object image formed by the photographic lens L. 2 is the view finder objective lens, 3' the half-permeable mirror, 5' the eye piece lens, 84 the mark board transparently provided on the view field mark, 85 the mark reflecting mirror and 86 the convex lens, whereby the above mentioned components constitute the conventional mark finder. 145, 146 and 147 are the optical fiber bundle whose one end is provided closely in front of the data display discs 74, 75 and 76 and whose other end is provided at the position conjugate to the mark board in the view finder optical board, whereby the fiber bundle is laid below the printing optical system and the photographic optical system. At the position opposed to the fiber bundle with reference to the display discs the mirror 87 is provided (FIG. 15). 88 is the mirror provided in the opening 89 in the upper part of the camera so as to be opened freely, whereby in the opened state of the mirror 88 the switch S1' corresponding to the above mentioned switch S1 is closed while the light is introduced into the camera from outside so as to be directed toward the mirror 87. The light reflected by the mirror 87 passes through the display discs 74 – 76, and the fiber bundle 145 – 147 so as to be led out of the end and travels below the mark reflecting mirror 85 so as to be introduced into the view finder optical path via the convex lens 86 and the half-permeable mirror 3' in such a manner that the data figures are displayed in the view finder visual field as is shown in FIG. 16. Further the light reaching the end a from the view finder reaches the display discs 74 – 76 through the fiber bundles 145 – 147 serving as guide so as to illuminate the figures on them.

In case of all the above mentioned embodiments, the optical fibers as the image guide or the light guide are laid in the camera body, whereby often in case of a compact camera a sufficient space in which such fiber bundles can be provided can not be obtained in the camera body. In consequence in case of the embodiment to be explained below, the optical fibers are arranged in the back cover of the camera, being so designed that the light from the data carrier is transmitted into the view finder optical path or its neighborhood.

In the drawing, 1 is the camera body, 201 the back cover fixed with hinges at the back of the camera so as to cover the loading chamber of the film cartridge 8 and the right and the left opening, 2 is the view finder objective lens, 4 the view field frame reflecting mirror, 5 the eye piece lens metallized with the view field frame, 6 the range finder mirror, 7 the convex lens and 3 the half-permeable mirror, whereby the above mentioned optical components constitute a well known range finder.

The data printing device is mounted in the neighborhood of the opposite side of the camera to the view finder, while a part of the gear of each data selecting drums 11, 12 and 13 projects outside of the camera body so as to be manually operated.

214, 215 and 216 are the data drums, on whose circumference the transparent numerical figures respectively for the year, the month and the date are provided, being rotatably provided around the cylinder shaft 217 fixed in the camera body and functionally engaged with the data selecting drum through the gears.

A lamp I is contained in the cylindrical shaft 217 in such a manner that when the lamp I lights up in functional engagement with the shutter release, the numerical figures for the year, the month and the date on the data rings are illuminate by the lamp I through the slit, whereby the image of the numerical figures is printed on the film plane through the mirrors 219 and 220 and the image forming lens 221. The data selecting drums 211, 212 and 213 are so supported that the above mentioned handling gears and the display discs 211a, 211b and 211c are connected to each other respectively by means of the shaft 211b, 212b and 213b as is shown in FIG. 20, whereby on the shaft 213b a cylinder shaft 212b and further another cylinder shaft 211b are adapted in such a manner that the discs are independently rotatable close to each other. The drums and the discs are made of a transparent material while the transparent figures such as numerical figures, characters and so on, on the black base are provided in a circular form on each disc, whereby the diameter of the circle along which the figures are provided differs from disc to disc. Close to the back of the discs an optical fiber bundle 226 as the image guide having the other end in the opening at the back of the camera is fixed, whereby by selectively handling the drums 211 – 213 each one figure of the numerical figures for the year, the month and the date on the data ring 214 is arranged in line focucing to the cylindrical shaft 217 while the display figures on the discs corresponding to the above figures are arranged facing to the fiber bundle 26 in sequence of the year, the month and the date from the above.

Each data selecting drum is kept in the adjusted position, the gear being engaged with the click spring 224.

In front of the data selecting drums a condenser lens 268 is provided so as to illuminate the numerical figures on the discs facing to the fiber bundle by means of the light coming from outside through the window at the front panel of the camera.

In the back cover 201 the optical fiber bundle 227 is supported by means of the spring 229 (FIG. 19), while beside the view finder eye piece lens 5 the fiber bundle 228 is fixed on the camera body in such a manner that the one end is exposed out of the back wall of the camera while the other C-shaped folded end is positioned in the opening beside the cartridge chamber. When the back cover 201 is closed, the one end of the optical fiber 227 is pressed against the output side the fiber bundle 226, while the other end is pressed against the input side of the fiber bundle 228 in such a manner that the numerical figures on the discs 211a, 212a and 213a are illuminated with the light coming from outside so as to be displayed beside the eye piece lens.

The light coming out from the end of the fibers extends in a certain determined angle so that also when the desired data figures are set by operating the data selecting drum in the declined state of the camera the data figures can clearly be observed as if floating on the display plane so that the set mode can easily be observed at the time of taking a picture.

The numerical figures are displayed in the display plane are displayed in sequence of the year, the month and the date from beneath when as is shown in FIG. 20(a) the numerical figures for the year are provided on the circumference of the disc 211a, the figures for the month on the disc 212a closer to the center than those for the year and the figures for the date on the disc 213a further closer to the center but in sequence of the year the month and the date from above when as is shown in FIG. 20 (b), the numerical figures for the year are provide on the disc 211a closest to the center while the figures for the date are provided on the circumference of the disc 213a.

In case of the above mentioned composition the fiber bundle 227 is in contact with the end planes of the fixed image guide 226 and 228 by means of the strength of a spring, so that the closest contact can be obtained between the end planes, whereby this can not always be obtained between the fibers so that the resolving power is somewhat lowered.

Let the then resolving power be R, the diameters of the fibers be D1 and D2 and the resolving power of the fibers be R1 and R2, so R1 = 1/2D1 while R2 = 1/D2, generally $1/R^2 = 1/R_1^2 + 1/R_2^2$, while R1 = R2 when D1 = D2. In consequence R = R1/$\sqrt{2}$.

In consequence the resolving power is lowered down to $(1/\sqrt{2})^2$, namely ½ even in case of the gapless contact, whereby, however, the fibers whose D is 5 – 10μ are used the resolving power of 50 – 25 lines per mm can be achieved, which is sufficiently practicable.

When in case same way as in case of the present embodiment a fiber bundle 226 is provided between the display discs 211a – 213a on the one side and the back cover on the other side, the set data can be read at the end plane of the bundle 226 in the opened state of the back cover, while when the discs are retired to the connecting position of the discs with the back cover the image guide 226 can be omitted.

FIG. 21 shows a variation of the embodiment explained in accordance with FIGS. 18 – 20, whereby the data is displayed in the view finder.

Namely, the output side of the image guide 228' provided beside the view finder is bent toward the inside of the camera contrary to the above mentioned embodiment so as to face to the view field frame reflecting mirror 4', whereby the image of the data figures on the display discs 211a – 213a composed in the same way as is shown in FIG. 18 is reflected on the data reflecting plane 4'a of the reflecting mirror 4' after having passed through the fiber bundles 226, 227 and 228 so as to be observed in the view finder through the eye piece lens 5 together with the object image and the view field frame image.

FIG. 22 shows other embodiment, whereby the end of the fiber bundle 227' supported in the back cover is bent outwards in such a manner that the data figures are displayed on the back of the back cover close to the view finder eye piece window without transmitting the data figures transmitted to the back cover further into the camera body.

FIG. 23 shows embodiment so designed that the data image is displayed enlarged. The embodiment shown in FIG. 23(a) comprises the display discs 211a – 213a and the fiber bundle 226 in the same way as in case of the embodiment shown in FIG. 18, whereby the fiber bundle 227₁ is kept on the back cover 201 in such a manner that the input side of the fiber bundle 227₁ whose output side is made larger than the input side is in contact with the output side of the fiber bundle 226 while the output side of the fiber bundle 227₁ can be observed through the display window provided on the back cover. The numerical figures on the discs are illuminated by the light coming through the window provided on the front board in the same way as in case of the embodiment shown in FIG. 18, so as to be displayed enlarged on the back cover by means of the fiber bundle 227₁ provided on the back cover through the fiber bundle 226.

In case of all of the above mentioned embodiments, the data figures are displayed by the light coming from the front side of the camera and passing through the discs, while FIG. 23(b) shows an embodiment so designed that the data figures are illuminated by the reflected light, whereby the discs 211′a, 212′a and 213′a consist of non-transparent material, having different diameters from each other and bearing the printed data figures on the surfaces in such a manner that the data figures are not supposed to each other.

The input side of the fiber bundle 266′ is formed in shape of step so as to be as close to each disc as possible as is shown in the drawing.

In the same way as in case of the fiber bundle 227₁ in FIG. 23(a) kept in the back cover, the fiber bundle 227₂ is formed conically in such a manner that the output side is larger than the input side. The output side is exposed on the back cover in such a manner that the light coming at this side illuminates the data figures on each disc while the light reflected on the discs displays the enlarged image at the output side through the fiber bundle. In case of the above mentioned composition, even when the discs are arranged distant from each other, it is possible to bring the input side of the fiber bundle sufficiently close to the figures by forming the input side in shape of step so as to be able to obtain a clear display.

As is shown in FIG. 23(b), it is not necessary to limit the display position just behind the figures. Namely it is possible to provide the fiber bundle 226′ slantly as is shown in FIG. 23(b), or to bend the fiber bundle or to place the fiber bundle at the most convenient position.

FIG. 24(a) shows an embodiment in which at the output side of the fiber bundle a lens is provided so as to display the image of the figures enlarged, whereby the data selecting drums and the display discs are composed in the same way as in case of the embodiment shown in FIG. 18 and at the output side of the fiber bundle 227″ kept in the back cover a magnifying lens 230 consisting of a reflecting plane 230a and a spherical plane 230b is arranged in such a manner that the image of the data figures transmitted via the fiber bundles 226 and 227″ is reflected on the reflecting plane 230a and enlarged on the spherical plane so as to be displayed enlarged in the window provided on the back cover.

FIG. 24(b) shows a variation of the embodiment shown in FIG. 24(a), whereby the same magnifying lens 230′ with prism as is shown in FIG. 24(a) displays the data figures in the neighborhood of the view finder, fixed at the left of the view finder.

FIG. 25 shows a variation of the data setting part and the data printing part, whereby the shaft of drums is provided vertically so as to achieve the simplification of the mechanism while in case of the afore mentioned embodiment the shaft is provided parallel to the optical axis of the photographic lens.

In the drawing, 231, 232 and 233 are the data setting gears being rotatably provided around a shaft vertical to the optical axis and engageable with respective gears of the data drums 214′, 215′ and 216′, whereby a part of each setting gear is exposed on the side wall of the camera so as to be manually operable. Each data drum consists of a transparent material in the same way as in case of the embodiment shown in FIG. 18, whereby on the circumference each two set of the transparent figures on the block basis are provided, the one set serving as data printing and the other set serving as data display.

The data drums are rotatably supported by means of three guide rollers 237 in contact with the internal circumference of the data drums, whereby in the inside space of the drums a lamp I is provided so as to illuminate the printing data figures through the slit provided in the lamp casing 238. Outside of the drum a prism 239 is provided so as to face to the above mentioned slit in such a manner that the light passing through the slit is directed toward the film plane by means of the prism so as to form an image on the film plane by means of the image forming lens 221 and print the data figures. 240 is a light guide to lead the light coming through the window on the front part of the camera to the inside of the drums, whereby the output side is positioned so as to face to the display data figures corresponding to the above mentioned printing data figures. The input side of the image transmitting fiber bundle 226′ is positioned so as to face to the output side of the above mentioned light guide outside of the data drums while the output side is provided at the position at which the output side is in contact with the input side of the fiber bundle 227 in the back cover in the same way as in case of the embodiment shown in FIG. 18, whereby the data figures set by operating the data setting gears are illuminated by means of the light from outside and displayed through the optical fiber bundles 226″ and 227 in the same way as in case of the above mentioned embodiment.

FIG. 26 shows an embodiment of the present invention applied to a single reflex camera as application. Different from the above mentioned embodiment, the present embodiment is so designed that the data device is built in the back cover of the camera so as to print the data from behind the film, whereby the data set in the back cover is displayed in the view finder through an optical fiber bundles.

In FIG. 26(a), 241 is the movable mirror, 242 the focusing plate, 243 the condenser lens, 244 the pentagonal prism, 245 the view finder eye piece lens and 246 the upper cover. 247 is the exchangeable back cover mounted on the camera body by means of hinges, whereby as is shown in FIG. 26(b) between the back cover and the conventional film pressing plate 248 the three data discs 249, 250 and 251, the optical fiber bundles 252, 253 and 254 as well as the lamps 255 and 256 are provided. On each data disc the printing data figures and the display data figures are provided as transparent characters in the same way as in case of the afore mentioned embodiment, whereby the discs 249 and 250 comprising the numerical figures respectively for the year and the month are connected to the not shown respective operation nobs through the shaft 257 and 258 penetrating the back cover, while disc 251 comprising the numerical figures for the date is connected to the operation nob 262 through the gears 260 and 261 and the shaft 259, 263, 264 and 265 are the printing optical fiber bundle, whose each output side is in contact with the back film plane F, penetrating the film pressing plate 248 and whose ach input side is in contact with the printing character of the respective disc. The imput sides of the display optical fiber bundles 252, 253 and 254 are in contact with the display figures of the respective discs, while the output sides are inserted in the respective openings provided along the upper folded line 247a of the back cover 247 in a line so as to align with the upper plane of the line 247a. On the lower face at the one side of the condenser lens 243 a right-angled prism 266 is cemented, whereby three optical fiber bundles 267 are arranged in such a manner that the one end of each bundle is in contact with the one side of the prism while the other end is in contact with the output side of the afore mentioned fiber bundle 252, 253, 254. When the lamp 256 lights up in the closed state of the back cover, the data figures on each disc are illuminated in such a manner that the image having passed through the fiber bundles 252, 253 and 254 and been reflected by the prism 266 is displayed in the view finder visual field through the condenser lens 243, the pentagonal prism 244 and the eye piece lens in the same dimentional and the same position relation as in the picture as is shown in FIG. 26(c). When the data is printed, the lamp 255 is made to light up for a certain determined time in functional engagement with the release operation of the shutter in the conventional way so as to illuminate the printing data figures on each disc in such a manner that the data figures are printed on the film from behind the film through the afore mentioned optical fiber bundles 263, 264 and 265, whereby these fiber bundles can be substituted with other conventional optical systems such as mirror, lens and so on. Further, the afore mentioned right-angled prism 266 can be substituted with a half-permeable mirror.

When the object image which overlaps the data image is white, it is often difficult to tell the data image from the object image in case of a color film, whereby in order to provide for such case it is recommended to apply a colored fiber to the lamp or to color the data figures themselves. Further the figures on the data discs can be transmitted to any position on the film as well as in the view finder by means of the optical fiber bundles as is shown in FIG. 26(b), there takes place no problem even if the diameter of the discs and therefore the distance between the discs are made larger while there takes place no restriction in the arrangement of the operation nob in case the discs are functionally engaged with the operation nob by means of gears so that the colors of the data figures can optionally be selected in accordance with the color of the object if the large diameters of the discs are chosen in such a manner that several sets of the same figures in different colors are arranged on each disc. In this way it is possible to print the data figures to be distinguished clearly in case the data figures overlap any object.

What is claimed is:

1. A data printing device for a camera comprising:
   a data figure carrier for carrying figures representing photographing data to be inserted on a portion of photosensitive film simultaneously with a picture image being photographed;
   data setting means interengaged with said data figure carrier for setting the data to be inserted on a photograph;
   a light source for illuminating the data figures set by the data setting means;
   optical means for guiding light flux passing through the set data figures to a film surface; and
   bundles of optical fibers being provided as optical means for guiding light flux supplied by said light source passing through the set data figures to an optical path of a view finder, one end of each of the optical fiber bundles facing said data figure carrier.

2. A data printing device for a camera according to claim 1, wherein said optical fiber bundles provided as said optical means for guiding light flux passing through the data figures to the view finder optical path also constitute a portion of said optical means for guiding said light flux passing through said data figures to the film surface.

3. A data printing device in accordance with claim 1, wherein the optical fiber bundles being provided in the back cover of the camera.

4. A data printing device for a camera comprising:
   a data figure carrier for carrying figures representing photographing data to be inserted on a portion of a photosensitive film simultaneously with a picture image to be photographed;
   data setting means interengaged with said data figure carrier for setting the data to be inserted on a photograph;
   a source of light introduced from outside the camera for illuminating the data figures set by the data setting means;
   optical means for guiding light flux passing through the set data figures to a film surface; and
   bundles of optical fibers being provided as optical means for guiding light flux supplied by said light source passing through the set data figures to an optical path of a view finder, one end of each of the optical fiber bundles facing said data figure carrier.

* * * * *